United States Patent
Uh

(10) Patent No.: US 7,851,078 B2
(45) Date of Patent: Dec. 14, 2010

(54) SECONDARY BATTERY WITH A SHOCK ABSORBING PORTION

(75) Inventor: Hwa Il Uh, Youngin-si (KR)

(73) Assignee: Samsung SDI Co., Ltd. (KR)

( * ) Notice: Subject to any disclaimer, the term of this patent is extended or adjusted under 35 U.S.C. 154(b) by 133 days.

(21) Appl. No.: 11/854,785

(22) Filed: Sep. 13, 2007

(65) Prior Publication Data

US 2008/0070097 A1 Mar. 20, 2008

(30) Foreign Application Priority Data

Sep. 15, 2006 (KR) ...................... 10-2006-0089560

(51) Int. Cl.
*H01M 2/12* (2006.01)
(52) U.S. Cl. ............................... 429/56; 429/53; 429/82
(58) Field of Classification Search .................... 429/53, 429/56, 82
See application file for complete search history.

(56) References Cited

U.S. PATENT DOCUMENTS 6,159,631 A * 12/2000 Thompson et al. ............ 429/82
6,964,690 B2 * 11/2005 Goda et al. ................. 29/623.1

FOREIGN PATENT DOCUMENTS

KR 20-0406077 1/2006

* cited by examiner

*Primary Examiner*—Dah-Wei D Yuan
*Assistant Examiner*—Zachary Best
(74) *Attorney, Agent, or Firm*—Knobbe Martens Olson & Bear LLP

(57) ABSTRACT

A secondary battery includes an electrode assembly, a can receiving the electrode assembly, and a cap assembly coupled to the open upper part of the can. In addition, a vent including an opening, which is thinner than the can is formed on a wide side of the can, and a shock absorbing portion, which is thinner than the can and thicker than the opening, is formed near the vent. Accordingly, the vent can be protected from damage from external shocks, which are absorbed by the shock absorbing portion.

18 Claims, 4 Drawing Sheets

SECONDARY BATTERY WITH A SHOCK ABSORBING PORTION

CROSS-REFERENCE TO RELATED APPLICATION

This application claims the benefit of Korean Patent Application No. 10-2006-0089560, filed on Sep. 15, 2006, the entire contents of which is incorporated by reference herein.

BACKGROUND

1. Technical Field

The disclosure relates to a secondary battery, more particularly, to a secondary battery in which a shock absorbing portion is formed near a vent formed on a wider side of a can so as to protect the vent from the damage by an external shock.

2. Description of the Related Art

In general, unlike primary batteries, which are not chargeable, secondary batteries are chargeable and dischargeable, and consequently, are widely used in a variety of high-tech electronic devices such as cellular phones, notebook computers, camcorders, and the like. Particularly, a lithium secondary battery has an operating voltage of about 3.6V, which is three times higher than that of a nickel-cadmium battery or a nickel-hydrogen battery. In addition, a lithium secondary battery has a high energy-density per unit weight. Accordingly, it shows a tendency to expand rapidly.

A typical lithium secondary battery uses lithium oxide as a positive electrode active material and a carbon material as a negative electrode active material. In addition, lithium secondary batteries can be formed in a variety of shapes, for example, cylinders, squares, or pouch shapes.

Of the shapes mentioned above, a square-type secondary battery includes an electrode assembly, a can receiving the electrode assembly, and a cap assembly coupled to the can. The electrode assembly includes a positive electrode, a negative electrode, a separator interposed between the positive electrode and negative electrode, and a positive electrode tab and a negative electrode tab, which protrude from the positive electrode and the negative electrode, respectively.

The can is a metal container in a rectangular shape, and is manufactured by a processing method such as deep drawing. Accordingly, the can itself can function as a terminal. Preferably, the can is made of aluminum or aluminum alloy, which is a light-weight conductive metal. The can is a container for the electrode assembly and an electrolyte, and its open upper part, through which the electrode assembly is inserted, is sealed by the cap assembly.

The cap assembly includes a cap plate coupled to the upper part of the can, an electrode terminal installed through a terminal through-hole, an insulating plate installed at the lower surface of the cap plate, and a terminal plate through which an electric current is applied as the electrode terminal is installed on the lower surface of the insulating plate. A gasket is disposed between the electrode terminal and the terminal through-holes. A negative electrode of the electrode assembly is coupled to the electrode terminal through the negative electrode tab and the terminal plate, and a positive electrode of the electrode assembly is coupled to the cap plate or the can through the positive electrode tab.

A vent can be formed on one side of the cap plate or on a wider side of the can. The vent is designed to rupture preferentially over other parts of the can or cap in order to discharge internal gas when the internal pressure of the battery increases due to overcharge and the like, thereby maintaining the physical integrity of the battery. The vent formed on the wider side of the can, hereinafter, referred to as a side vent, comprises an opening of a predetermined thickness.

However, a conventional side vent has several drawbacks. In general, the thickness of a can is about 0.3 mm, and the thickness of the opening of a side vent is barely about dozens of micrometers. Primarily, internal gas pressure in the battery preferentially ruptures the vent opening instead of another part of the can or cap assembly, thereby confining the contents of the battery in the can. However, the opening of the vent is so thin that it can be cracked or ruptured by a slight external shock. That is to say, the reliability of the battery can be compromised if the vent is damaged.

SUMMARY OF THE INVENTION

Some embodiments provided herein solve one or more of the above and/or other problems. In one aspect, damage to a vent caused by an external shock or impact is prevented by forming a shock absorbing portion proximal to a vent that is formed on a wide side of a can.

To accomplish the aspect, a secondary battery according to an exemplary embodiment includes an electrode assembly, a can receiving the electrode assembly, and a cap assembly coupled to the opened upper part of the can. In addition, a vent including an opening, which is thinner than surrounding wall of the can is formed on a wide side of the can, and a shock absorbing portion, which has the thickness between that of the can and that of the opening, is formed proximal to the vent.

A secondary battery according to an alternate embodiment for accomplishing the aspect includes an electrode assembly, a can receiving the electrode assembly, a cap assembly coupled to the opened upper part of the can. In addition, a vent including an opening, which is thinner than the adjacent wall of the can, is formed on the wide side of the can, and a shock absorbing portion, which is thicker than the opening, is formed between the opening of the vent and an edge of the wide side of the can.

Other embodiments provide a secondary battery, comprising: an electrode assembly; a can receiving the electrode assembly through an opening at the upper part of the can; a cap assembly coupled to the opening at the upper part of the can; a vent formed on a wide side of the can, the vent comprising an opening that is thinner than the can; and a shock absorbing portion with a thickness between that of the can and that of the vent opening formed proximal to the vent.

In some embodiments, the shock absorbing portion is disposed between the opening of the vent and an edge of the wide side of the can. In some embodiments, a shape of the opening of the vent comprises an open polygon or an open curve with an open portion oriented towards the center of the wide side of the can. In some embodiments, the vent is centered between two upper corners of the wide side of the can.

In some embodiments, the shock absorbing portion is placed at least between the opening and an upper edge of the wide side of the can. In some embodiments, the opening of the vent is an open polygon, and one edge of the opening of the vent is parallel with the upper edge of the wide side of the can.

In some embodiments, the shock absorbing portion comprises a line segment parallel to the one edge of the opening of the vent. In some embodiments, the shock absorbing portion is undulating and parallel to the one edge of the opening of the vent.

In some embodiments, the shock absorbing portion is longer than the one edge of the opening of the vent, and the left and right ends of the shock absorbing portion extend past the left and right ends of the one edge of the opening.

In some embodiments, the shock absorbing portion is disposed between the opening of the vent and the upper edge of the wide side of the can, the shape of the shock absorbing portion comprises an open polygon or an open curve open towards the center of the wide side of the can.

Some embodiments comprise a plurality of shock absorbing structures.

In some embodiments, the vent opening is disposed at least one upper corner of the wide side of the can. In some embodiments, the shock absorbing portion is disposed at least between the opening of the vent and the upper edge of the wide side of the can, and between the opening of the vent and one of a left edge and a right edge of the wide side of the can proximal to the opening. Some embodiments comprise an undulating shock absorbing portion. In some embodiments, the shock absorbing portion comprises an open polygon or an open curve open towards the center of the wide side of the can.

Some embodiments provide a secondary battery, comprising: an electrode assembly; a can receiving the electrode assembly through an open upper part of the can; a cap assembly coupled to the open upper part of the can; a vent comprising an opening, thinner than a portion of the can peripheral thereto, and formed on a wide side of the can, and a shock absorbing portion thicker than the opening of the vent and formed between the opening of the vent and an edge of a wide side of the can.

In some embodiments, the shock absorbing portion is convex or concave.

BRIEF DESCRIPTION OF THE DRAWINGS

The above and other aspects, features and advantages will be more apparent from the following detailed description taken in conjunction with the accompanying drawings, in which.

DETAILED DESCRIPTION OF CERTAIN EMBODIMENTS

Hereinafter, exemplary embodiments of a secondary battery will be described more particularly with reference to the accompanying drawings.

Figure 1:
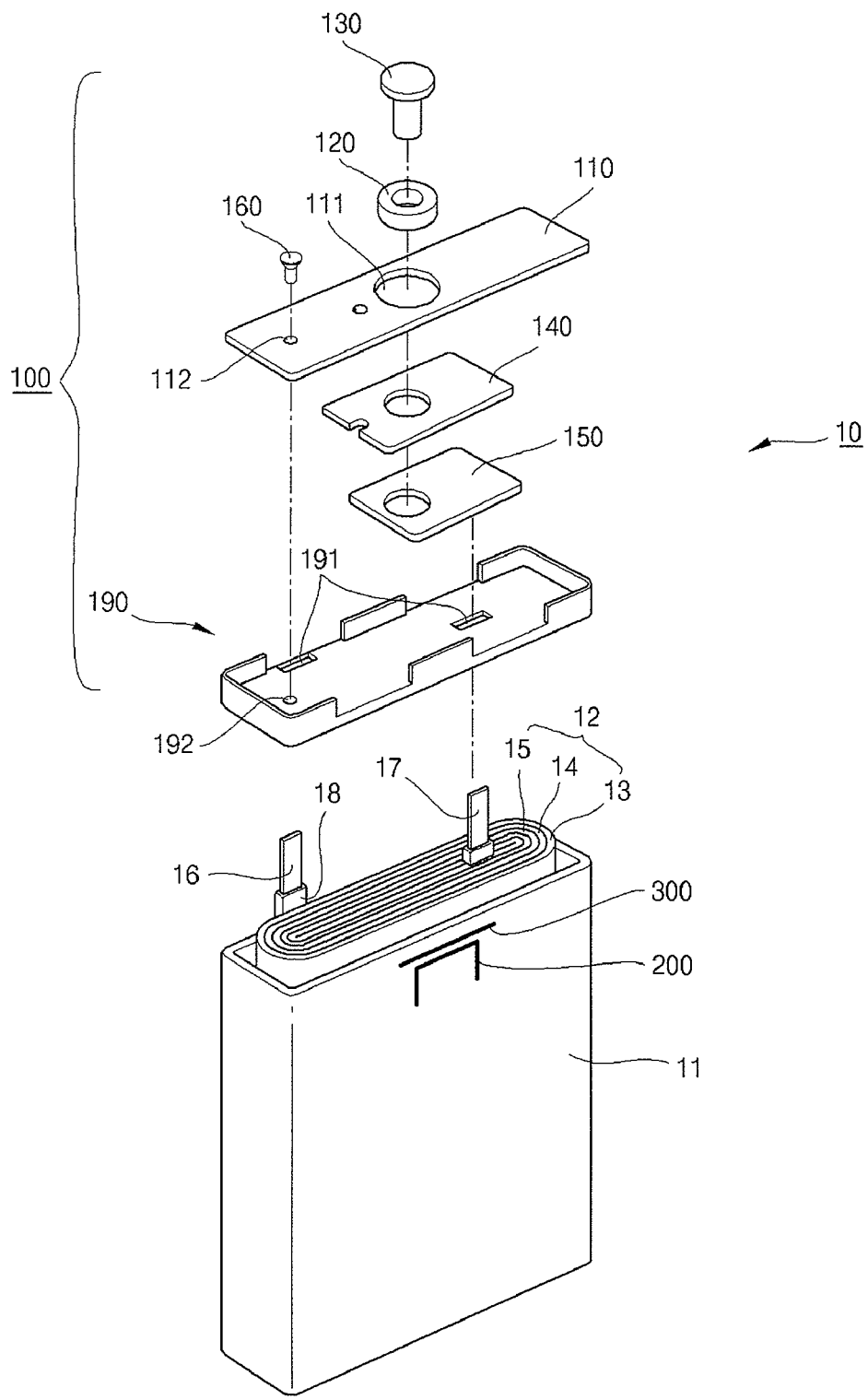
FIG. 1 is an exploded perspective view depicting a secondary battery according to an exemplary embodiment.

FIG. 1 is an exploded perspective view depicting a secondary battery according to an exemplary embodiment. Referring to FIG. 1, a secondary battery 10 includes an electrode assembly 12, a can 11 for receiving the electrode assembly 12, and a cap assembly 100 coupled to the can 11.

In the electrode assembly 12, a positive electrode 13 and a negative electrode 15 are each formed in a wide plate shape for improving the capacity of the battery 10. Subsequently, the electrode assembly 12 is laminated by interposing a separator 14, between the positive electrode 13 and the negative electrode 15, which insulates the positive electrode 13 and the negative electrode 14 each other, and then the electrode assembly 12 is spirally wound in a so-called jelly-roll shape. The negative electrode 15 and the positive electrode 13 can be formed by coating each collector, which are made of copper foil and aluminum foil, respectively, with carbon, which is a negative electrode active material and lithium cobalt oxide (LiCoO2), which is a positive electrode active material, respectively. The separator 14 is made of polyethylene, polypropylene, or a co-polymer of polyethylene and polypropylene. Preferably, the separator 14 should be wider than the positive electrode 13 and the negative electrode 15 to prevent a short circuit between the electrode plates. A positive electrode tab 16 and a negative electrode tab 17 coupled to each electrode protrude from the electrode assembly 12. An insulating tape 18 for preventing a short circuit between the electrode plates 13 and 15 is wound around the positive electrode tab 16 and the negative electrode tab 17 where each passes through the electrode assembly 12.

In a square shaped secondary battery, the can 11 is a metal container that has a roughly rectangular parallelepiped shape as illustrated in FIG. 1. The can 11 is formed by a suitable manufacturing method such as a deep drawing and the like. Accordingly, the can 11 itself can function as a terminal. Preferably, the can 11 is made of aluminum or aluminum alloy, which is a light-weight conductive metal. The can 11 is a container for receiving the electrode assembly 12 and an electrolyte, and the opening through which the electrode assembly 12 is inserted, is sealed by the cap assembly 100. An opening 200 of a vent and a shock absorbing portion 300 are formed on a wide side of the can 11, and are described in detail below.

The cap assembly 100 includes a cap plate 110, an electrode terminal 130, an insulating plate 140, and a terminal plate 150. A terminal through-hole 111 is formed in the cap plate 110, and the electrode terminal 130 is installed through the terminal through-hole 111 with a gasket 120 surrounding the external surface of the electrode terminal 130 for insulating the electrode terminal 130 from the cap plate 110. The insulating plate 140 is installed on the lower surface of the cap plate 110, and the terminal plate 150 is installed on the lower surface of the insulating plate 140. The lower part of the electrode terminal 130 is coupled to the terminal plate 150.

The negative electrode 15 of the electrode assembly 12 is coupled with the electrode terminal 130 through the negative electrode tab 17 and the terminal plate 150. In the case of the positive electrode 13 of the electrode assembly 12, the positive electrode tab 16 is welded to the cap plate 110 or the can 11. An insulating case 190 can also be installed under the electrode plate 150. The insulating case 190 can include electrode tab holes 191 for each of the positive electrode tab 16 and the negative electrode tab 17. A battery with the opposite polarity can also be made, as would be understood by one skilled in the art.

An electrolyte injection hole 112 for injecting an electrolyte into the inside of the can 11 is formed on one side of the cap plate 110. An electrolyte supply hole 192, under the electrolyte injection hole 112, can be formed on the insulating case 190 so that electrolyte is supplied to the electrode assembly 12 therethrough. After injecting an electrolyte, the electrolyte injection hole 112 is sealed with a sealing plug 160.

Figure 2:
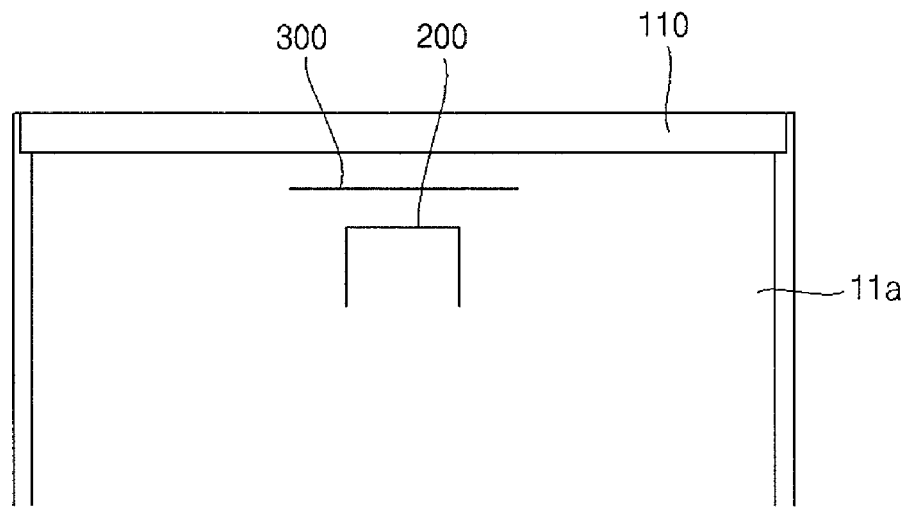
FIGS. 2 to 5 are partial enlarged views of a wide side of a can of a secondary battery according to certain exemplary embodiments.

A vent and a shock absorbing portion 300 formed on a wide side of the can 11 will now be described in greater detail. Referring to FIG. 2, in a secondary battery according to an exemplary embodiment, a vent including an opening 200, which is thinner than the immediately surrounding wall of the can 11, is formed on a wide side 11a of the can, and a shock absorbing portion 300, which has a thickness between that of the can and that of the opening 200, is formed proximal and/or near the vent.

The opening 200 of the vent is configured to be ruptured prior to other parts of the battery 10, for example, other parts of the can 11 and/or the cap assembly 100, in order to discharge internal gas when the pressure inside the battery 10 increases due to overcharge and the like, so as to maintain the physical integrity of the battery 10.

The shock absorbing portion 300 is formed proximal and/or near the vent, and is thicker than the opening 200 so that it is not ruptured prior to the opening 200. In addition, according to an exemplary embodiment, the shock absorbing portion 300 can be formed in a variety of shapes, such as a groove of a uniform depth, or a groove of a non-uniform depth. According to an alternate embodiment, the shock absorbing portion 300 can also be formed concavely or convexly, as an indentation or a bulge, respectively, with the same thickness as other parts of the can 11, as described below.

Preferably, the shock absorbing portion 300 is formed between the opening 200 of the vent and the edge of the wide side 11a of the can. This is to prevent the opening 200 from being damaged as an external shock or impact passes through the shock absorbing portion 300, which is a buffering zone, before it is transmitted to the opening 200 of the vent, thereby reducing or preventing damage to the opening 200 of the vent, for example, the rupture of the opening 200.

The shock absorbing portion 300 does not interfere with the primary role of the vent, which is to release internal gas pressure of the battery as described above. Consequently, it is possible to provide a secondary battery that has an excellent shock resistance while the vent plays its primary role.

The shape of the opening 200 of the vent can be an open polygon and/or an open curve. The shape of the opening in FIG. 2 is an open polygon, and the opening is oriented or placed toward the center of the wide side 11a of the can. However, the shape of the opening 200 is not limited to this exemplary embodiment.

The opening 200 of the vent is placed between the upper two corners of the four corners of the wide side 11a of the can. When the distribution of stress exerted on the wide side 11a of the can by internal gas of the battery is examined, the tensile stress increases in the order of: the edge of the can, the face of the can, and the corner of the can. That is to say, when the can swells by the internal gas pressure of the can, the greatest stress is exerted on the corner of the can. Therefore, if the opening 200 of the vent is formed at the corner of the can 11, the wall of the can 11 will split open when the opening 200 is ruptured by internal pressure. Consequently, the electrode assembly 12 and/or the electrode tabs 16 and/or 17 can be damaged, and the electrode assembly can burst out of the can 11, and thus the reliability of the battery 10 can be compromised. To avoid this problem, the opening 200 of the vent is formed between the upper two corners of the four corners of the wide side 11a of the can. However, other embodiments are not limited to a vent formed at the position mentioned above.

Here, preferably, the shock absorbing portion 300 is placed at least between the opening 200 of the vent and the upper edge of the wide side 11a of the can. When an external shock or impact is applied to the upper edge, the lower edge (not shown), the left edge, or the right edge of the wide side 11a, as illustrated in FIG. 2, the most damaging impact to the opening 200 is to the upper edge of the wide side 11a of the can. Accordingly, in order to absorb the most damaging impacts, the shock absorbing portion 300 is placed at least between the opening 200 of the vent and the upper edge of the wide side 11a of the can.

In addition, as illustrated in the drawings, in embodiments in which that the shape of the opening 200 of the vent is an open polygon, one edge, the upper edge in the illustrated embodiment, of the opening 200 of the vent is formed parallel with the upper edge of the wide side 11a of the can. The opening 200 can be ruptured more readily when the one edge, for example, the upper edge, of the opening 200 of the vent is formed in a straight line rather than a curved line. Moreover, designing the rupture pressure of the vent becomes easier because the stress generated by the internal gas of the battery 10 is exerted on the opening 200 of the vent evenly along the one edge (e.g., the upper edge) of the opening 200 of the vent, which is formed in a straight line and generally parallel, not angled and/or oblique with respect to the upper edge of the wide side 11a of the can.

Here, as illustrated in FIG. 2, the shape of the shock absorbing portion 300 can include a line segment generally parallel with one edge of the opening 300 of the vent. As described above, in order to absorb the most damaging impact to the vent, the shock absorbing portion 300 is placed between the opening 200 of the vent and the upper edge of the wide side 11a of the can, and is formed in a shape of a line segment generally parallel with one edge of the opening 300 of the vent. Consequently, designing the shock absorbing portion 300, which can evenly absorb the transmission of the external shock becomes easier.

Here, the shock absorbing portion 300 is longer than the one edge of the opening 200 of the vent with which it is generally parallel. For example, in the illustrated embodiment, the left and right ends of the shock absorbing portion 300 extend past the left and right ends of the one edge of the opening 200. This permits the shock absorbing portion 300 to absorb obliquely applied shocks as well as vertically applied shocks to the opening 200 from the upper edge of the wide side 11a of the can.

Figure 3:
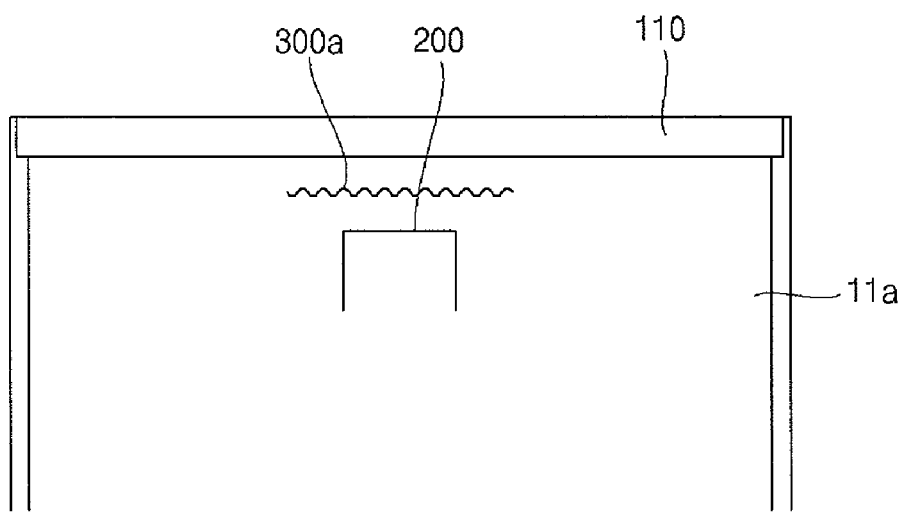

In addition, as illustrated in FIG. 3, an undulating, serpentine, and/or wavy shock absorbing portion 300a can be formed generally parallel with the one edge (e.g., the upper edge) of the opening 200 of the vent. The undulating shock absorbing portion 300a is longer than the straight shock absorbing portion 300 illustrated in FIG. 2. Accordingly, shock absorption is more effective.

Here, the shock absorbing portion 300a is longer than the one edge of the opening 200 of the vent, with the left and right ends of the shock absorbing portion 300a extending past the left and right ends of the one edge of the opening 200. This is to absorb obliquely applied shocks as well as vertically applied shocks to the opening 200 from the upper edge of the wider side 11a of the can.

Figure 4:
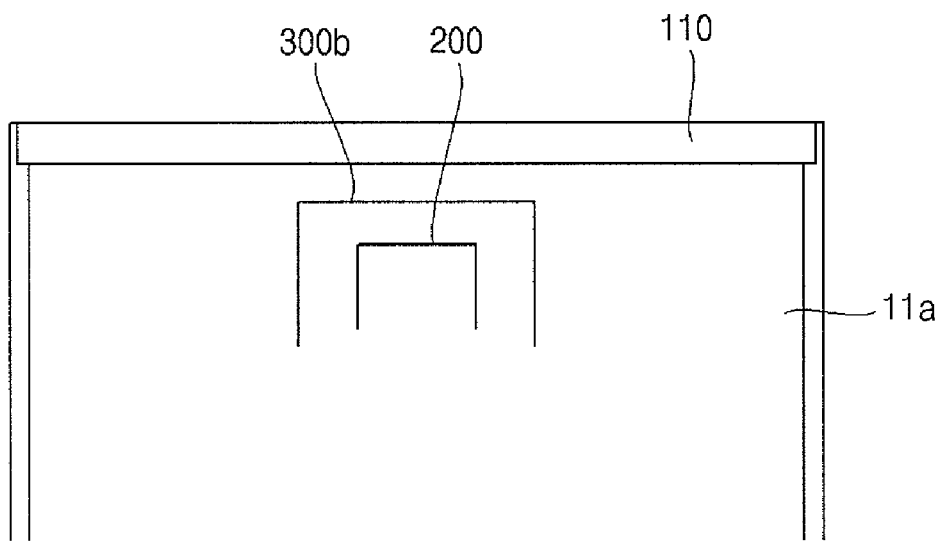

Referring to FIG. 4, a shock absorbing portion 300b is placed between the opening 200 of the vent and the edge of the wide side 11a of the can, and the shape of the shock absorbing portion 300b is an open polygon or an open curve. Furthermore, the opening of the shock absorbing portion 300b is oriented towards the center of the wide side 11a of the can. In the case of the exemplary embodiment mentioned here, shock absorption becomes much more effective because most of the paths over which shocks can be transmitted are blocked by the shock absorbing portion 300b, including shocks from the upper edge of the wide side 11a of the can, as well as shocks from the left and right edges of the wide side 11a of the can. Here, the shock absorbing portion 300b can be undulating as described above, and it can also be formed in a variety of other shapes, as well.

Figure 5:
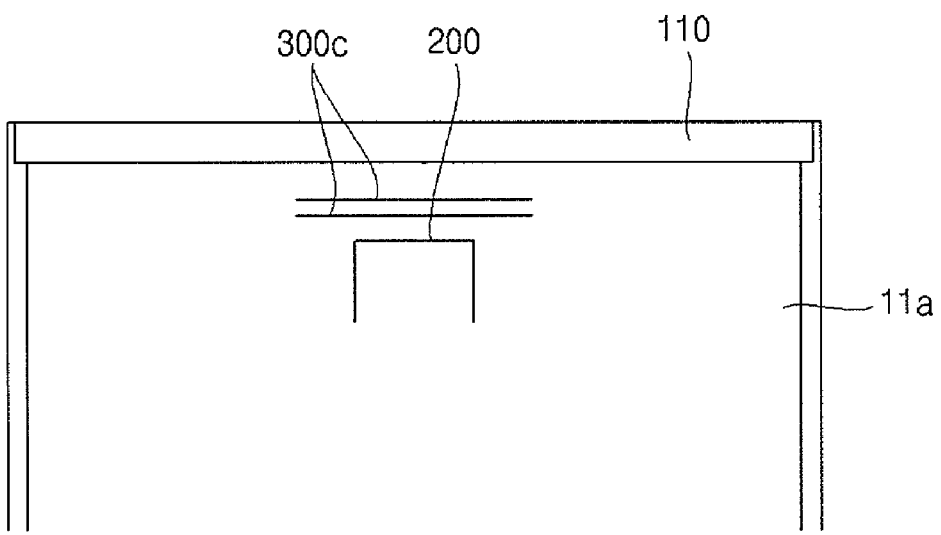

In some embodiments, a shock absorbing portion comprises a plurality of shock absorbing structures of the types illustrated in FIGS. 2 to 4. An exemplary embodiment, in which the shock absorbing portion 300c comprises a plurality of shock absorbing structures of the type illustrated in FIG. 2 is illustrated in FIG. 5. Accordingly, the shock absorbing effect can be enhanced.

Figure 6:
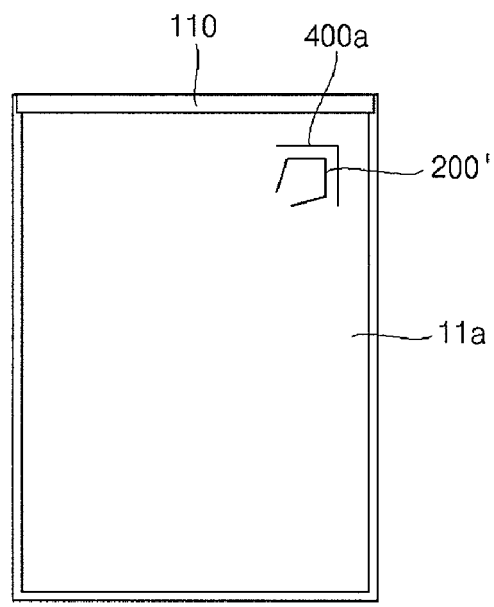
FIG. 6 and FIG. 7 are front views of a wide side of a can of a secondary battery according to certain exemplary embodiments.

As illustrated in FIG. 6, an opening 200' of the vent can be placed at least one of the upper two corners from among the four corners of the wide side 11a of the can. As describe above, the stress is greatest in the corners when the can 11 swells from the pressure of the internal gas. Accordingly, the vent can operate more sensitively to internal pressure. In addition, the opening 200' of the vent can be relatively thick, thus, the time and cost for manufacturing the vent can be reduced.

In such a case, the shock resistance can be improved because the vent opening is relatively thicker compared with a vent opening formed between the upper two corners. However, the vent opening can be damaged by the external shock more easily because the path through which the external shock is transmitted becomes relatively shorter and the shock generating zone where the can 11 is impacted is relatively large.

Accordingly, a shock absorbing portion 400a is preferably formed at least between the opening 200' of the vent and the upper edge of the wide side 11a of the can, and between the opening 200' and an edge that is closer or proximal to the opening 200', selected from the left and right edge. In FIG. 6, the opening 200', which is an open pentagon, is formed at the upper right area of the wide side 11a of the can, and the shock absorbing portion 400a is formed between the opening 200' of the vent and the upper edge of the wide side 11a of the can, and between the opening 200' and the right edge of the wide side 11a of the can. The middle part of the shock absorbing portion 400a forms an angle of about 90°.

Referring to FIG. 6, a part of the shock absorbing portion 400a, which is roughly parallel with the upper edge of the pentagonal opening 200', is longer than the upper edge of the pentagonal opening 200', and a part of the shock absorbing portion 400a, which is roughly parallel with the right edge of the pentagonal opening 200', is longer than the right edge of the pentagonal opening 200'. This is to absorb oblique as well as vertical shocks to the opening 200' from both the upper and right edges of the wider side 11a of the can.

Furthermore, an undulating shock absorbing portion 400a can be formed parallel with the opening 200', and in addition, a plurality of shock absorbing structures can be formed. In such a case, the shock absorbing effect will be enhanced.

Figure 7:
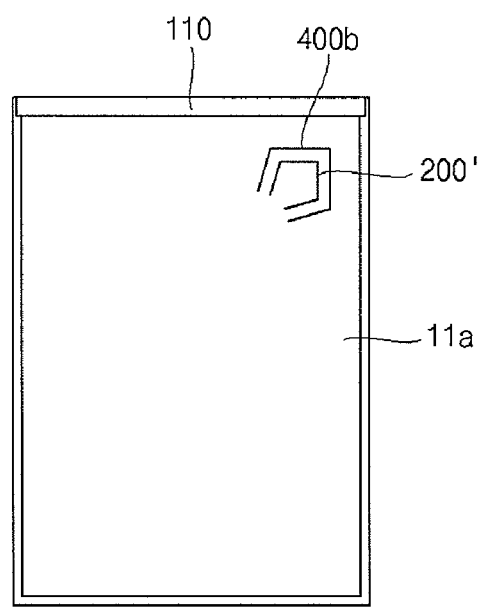

Referring to FIG. 7, a shock absorbing portion 400b is placed between the opening 200' of the vent and the top and proximal side edges of the wide side 11a of the can, and the shape of the shock absorbing portion 400b is an open polygon or an open curve. In addition, the opening of the shock absorbing portion 400b is oriented towards the center of the wide side 11a of the can. In the case of the exemplary embodiment mentioned here, shock absorption is much more effective because most of the paths through which shock can be transmitted are blocked, including not only shocks from the left and right edges of the wide side 11a of the can but also from the top and bottom edges. Here, the shock absorbing portion 400b can be undulating, and it can be formed in a variety of other shapes as well. In addition, a plurality of shock absorbing structures can also be formed.

In the exemplary embodiments described above, the shock absorbing portion is formed as a groove of a uniform depth. However, in other exemplary embodiments, a groove is not formed. Instead, the shock absorbing portion comprises a ridge or bulge, or trough or indentation formed in the can for absorbing the external shocks. Accordingly, the shape of the shock absorbing portion can be convex or concave. The features of the exemplary embodiments described above can be applied to other the exemplary embodiments.

Exemplary embodiments are described herein and illustrated in the drawings. However, various modifications and changes can be made by those skilled in the art within the scope of the disclosure.

What is claimed is:

1. A secondary battery, comprising:
an electrode assembly;
a can comprising an opening that receives the electrode assembly through the opening;
a cap assembly that covers and seals the opening;
a vent formed on aside of the can, perpendicular to the opening with a wall thickness thinner than a wall thickness of the can so that the vent opens to discharge internal pressure within the can when the internal pressure exceeds a pre-determined value that the can and the cap assembly can withstand without rupturing, wherein the vent comprises a cut on the side of the can defining a shape of the vent so that the vent opens along the cut, wherein the shape of the vent comprises an open polygon or an open curve with an open portion oriented generally away from the opening of the can; and
a shock absorbing portion formed proximal to the vent with a wall thickness thicker than the vent, wherein the shock absorbing portion comprises at least one path of groove or indentation on the said side of the can wherein the shock absorbing portion comprises the groove or indentation formed inward on the side of the can.

2. The secondary battery of claim 1, wherein the shock absorbing portion is disposed between the vent and an edge of the side of the can.

3. The secondary battery of claim 1, wherein the vent is disposed between corners of the side of the can.

4. The secondary battery of claim 3, wherein the shock absorbing portion is placed at least between the vent and the opening of the can.

5. The secondary battery of claim 4, wherein the vent is an open polygon, and a first edge of the vent is parallel to the opening of the can.

6. The secondary battery of claim 5, wherein the shock absorbing portion comprises a portion parallel to the first edge of the vent.

7. The secondary battery of claim 5, wherein the shock absorbing portion is undulating and parallel to the first edge of the vent.

8. The secondary battery of claim 6, wherein
the shock absorbing portion is longer than the first edge of the vent, and
ends of the shock absorbing portion extend past the ends of the first edge of the opening.

9. The secondary battery of claim 7, wherein
the shock absorbing portion is longer than the first edge of the vent, and
ends of the shock absorbing portion extend past the ends of the first edge of the opening.

10. The secondary battery of claim 5, wherein
the shock absorbing portion is disposed between the vent and the opening of the can,
the path of the shock absorbing portion comprises an open polygon or an open curve with an open portion generally away from the opening of the can.

11. The secondary battery of claim 6, comprising a plurality of shock absorbing structures.

12. The secondary battery of claim 7, comprising a plurality of shock absorbing structures.

13. The secondary battery of claim 1, wherein the vent is disposed near at least one corner of the side of the can.

14. The secondary battery of claim 13, wherein the shock absorbing portion is disposed at least between the vent and the opening of the can, and between the vent and an edge of the side of the housing proximal to the vent.

15. The secondary battery of claim 14, comprising an undulating shock absorbing portion.

16. The secondary battery of claim 14, wherein the path of the shock absorbing portion comprises an open polygon or an open curve that is open generally away from the opening of the can.

17. The secondary battery of claim 15, comprising a plurality of shock absorbing structures.

18. The secondary battery of claim 1, wherein the shock absorbing portion comprises a bulge that is concave or convex on the side of the can.

* * * * *